(12) United States Patent  (10) Patent No.: US 7,469,277 B2
Hirata et al.  (45) Date of Patent: Dec. 23, 2008

(54) INFORMATION OUTPUT APPARATUS, INFORMATION OUTPUT METHOD, INFORMATION OUTPUT PROGRAM, INFORMATION TRANSMITTING APPARATUS, INFORMATION TRANSMITTING METHOD, INFORMATION TRANSMITTING PROGRAM, AND INFORMATION OUTPUT SYSTEM

(75) Inventors: Takashi Hirata, Kanagawa (JP); Ken-ichi Fujii, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 967 days.

(21) Appl. No.: 10/869,559

(22) Filed: Jun. 16, 2004

(65) Prior Publication Data

US 2005/0010363 A1  Jan. 13, 2005

(30) Foreign Application Priority Data

Jun. 17, 2003  (JP) ............................. 2003-172012
Jun. 19, 2003  (JP) ............................. 2003-174818

(51) Int. Cl.
 *G06F 15/16* (2006.01)
(52) U.S. Cl. ................... 709/219; 709/243; 342/357.06; 342/357.08
(58) Field of Classification Search ................. 709/243, 709/219; 342/357.08, 357.12
See application file for complete search history.

(56) References Cited

U.S. PATENT DOCUMENTS 5,689,269 A * 11/1997 Norris ................... 342/357.08
6,212,390 B1 * 4/2001 Rune ........................ 455/456.6
6,304,211 B1 * 10/2001 Boman ................... 342/357.08
6,529,159 B1 * 3/2003 Fan et al. ................ 342/357.09
6,810,413 B1 * 10/2004 Rajakarunanayake et al. .......................... 709/203
6,813,561 B2 * 11/2004 MacNeille et al. .......... 701/213
7,099,774 B2 * 8/2006 King et al. .................. 701/213
7,177,907 B2   2/2007 Sakata
2002/0152019 A1 * 10/2002 Morita ....................... 701/207
2003/0198346 A1 * 10/2003 Meifu et al. ................ 380/258
2003/0217122 A1 * 11/2003 Roese et al. ................ 709/219
2004/0030756 A1 * 2/2004 Matsuyama et al. ......... 709/217

FOREIGN PATENT DOCUMENTS

JP  8-33032  2/1996
JP  2001-167018 A  6/2001
JP  2002-218521 A  8/2002
JP  2002-262337 A  9/2002
JP  2002-280983  9/2002
JP  2002-298007  10/2002
JP  2003-016347  1/2003

* cited by examiner

*Primary Examiner*—Saleh Najjar
*Assistant Examiner*—Waseem Ashraf
(74) *Attorney, Agent, or Firm*—Morgan & Finnegan, LLP

(57) ABSTRACT

An information output apparatus which is capable of limiting a range for outputting information based on a position. A position information acquiring section acquires first position information, a message receiving section receives information including second position information, and a message transferring section transfers the received information. The message transferring section transfers the received information when the first position information acquired by the position information acquiring section falls within a predetermined range of the second position information received by the message receiving section.

11 Claims, 9 Drawing Sheets

INFORMATION OUTPUT APPARATUS, INFORMATION OUTPUT METHOD, INFORMATION OUTPUT PROGRAM, INFORMATION TRANSMITTING APPARATUS, INFORMATION TRANSMITTING METHOD, INFORMATION TRANSMITTING PROGRAM, AND INFORMATION OUTPUT SYSTEM

BACKGROUND OF THE INVENTION

1. Field of the Invention

The present invention relates to an information output apparatus, an information output method, and an information output program, which output information received, and an information transmitting apparatus, an information transmitting method, and an information transmitting program, which transmit information, and also relates to an information output system having the information output apparatus and the information transmitting apparatus.

2. Description of the Related Art

With diffusion of communications using the Internet, sales promotion and advertising via the Internet have been becoming increasingly active.

Conventionally, client-server systems are used to distribute information, such as advertisements via various networks including the Internet. A client-server system includes a server providing information and clients receiving the information from the server. In this system, the relationship between the information providing side and the information receiving side is simple in the sense that only the information providing side, i.e. the server is too heavily loaded.

Solutions to this problem with the client-server system include P-to-P (Peer to Peer) systems. A P-to-P system does not include components corresponding to a server and a client PC (personal computer) as used in a client-server system, but is comprised of a plurality of peers, each of which has the functions of both a server and a client PC. The P-to-P system is characterized in that the information providing side and the information receiving side are equal, and thus their loads are distributed over the entire network involved.

The P-to-P systems include a hybrid type and a pure type.

Figure 9A:
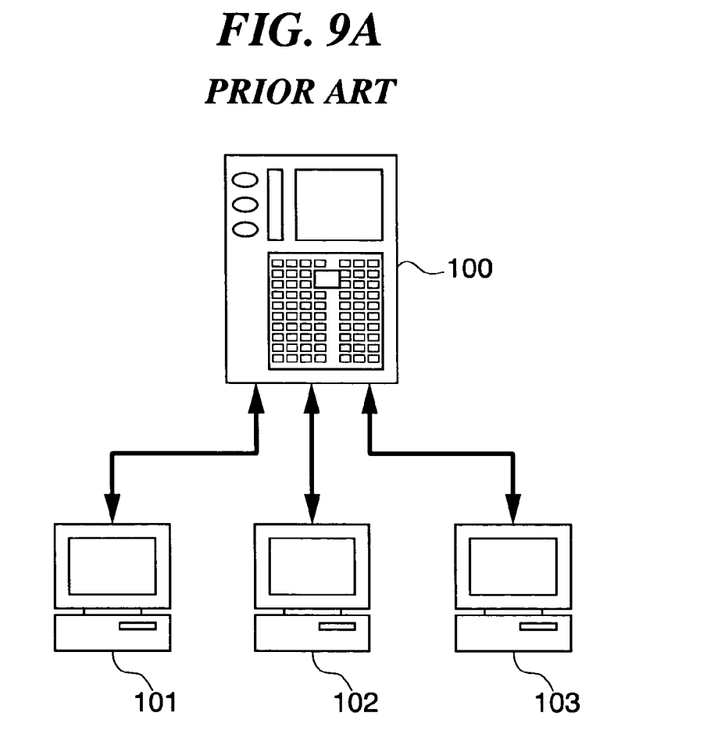
FIG. 9A is a diagram showing the configuration of a hybrid type P-to-P system.

FIG. 9A is a diagram showing the configuration of a hybrid type P-to-P system.

In the hybrid type P-to-P system, user PCs 101 to 103 are connected to a core server 100 to transmit file lists stored in the PCs 101 to 103 to the server 100. The user PCs share the file lists, so that each of the user PCs searches the core server 100 for a file of another user PC, and thereafter the user PCs exchange the files directly.

Figure 9B:
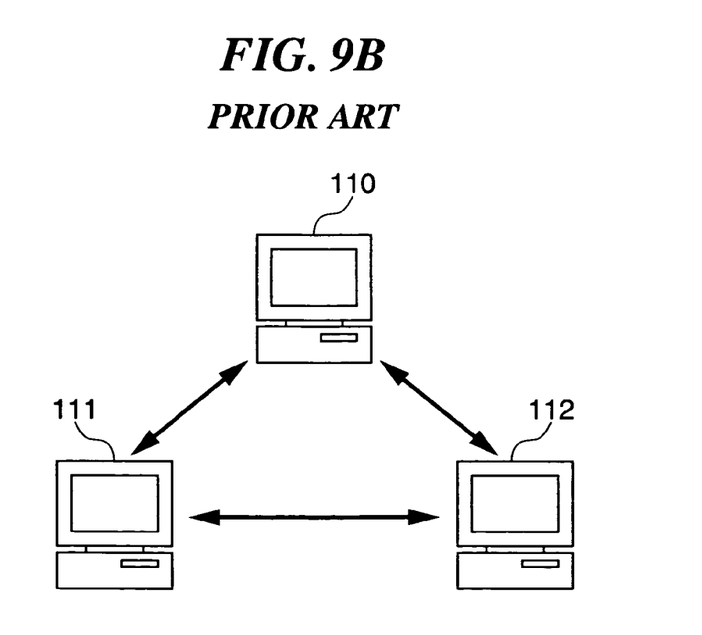
FIG. 9B is a diagram showing the configuration of a pure type P-to-P system.

FIG. 9B is a diagram showing the configuration of a pure type P-to-P system.

In FIG. 9B, the pure type P-to-P system is comprised of PCs 110, 111, and 112 through which information is transmitted.

As information distribution systems employing the pure type P-to-P system which distribute information such as advertisements, an information distribution system has been proposed, which pays attention to the similarity between the profiles of users to which the information is distributed and is capable of distributing information to users with similar interests to those of users who showed interest in particular information (e.g. Japanese Laid-Open Patent Publication (Kokai) No. 2002-298007).

In this proposed information distribution system employing the pure type P-to-P system, information distribution is carried out such that information is sequentially transmitted from one of a plurality of peers to another within a range determined by TTL (Time to Live) which is arbitrarily set to a value indicative of how many peers ahead the information is to be transmitted to.

A source peer that distributes information sets a predetermined value as the TTL, and a peer that has received the information decrements by 1 the TTL value attached to the information, and transmits the information and the decremented TTL value to a next peer. This sequential transmission of the information continues until the TTL value becomes zero.

It should be noted that a peer means a PC on which application software of the pure type P-to-P system is executed.

However, in the above-mentioned conventional pure type P-to-P system, the distribution range for information is determined by the TTL indicative of how many peers ahead the information should be transmitted to, and thus the distribution range cannot be set based on a physical distribution range or transmission distance in order to meet needs, such as the user of a source peer wishing to distribute information to peers within a 2-kilometer radius from the source peer, or only to peers within a transmission distance of 2 kilometers.

For example, let it be assumed that there are peers A and B in the above-mentioned conventional pure type P-to-P system and the peer A is away from the source peer a transmission distance of 1 kilometer and the peer B a transmission distance of 10 kilometers, with the TTL set to 1. In such a situation, even if the user of the source peer wishes to distribute information to the peer within a 2-kilometer radius, or to the peer within a transmission distance of 2 kilometers, the system does distribute the information to both the peers.

SUMMARY OF THE INVENTION

It is an object of the present invention to provide an information output apparatus, an information output method, an information output program, an information transmitting apparatus, an information transmitting method, an information transmitting program, and an information output system, which are capable of limiting a range for outputting information based on a position.

To attain the above object, in a first aspect of the present invention, there is provided an information output apparatus comprising an acquiring device that acquires first position information, a receiving device that receives information including second position information, and an output device that outputs the information received by the receiving device, when the first position information acquired by the acquiring device falls within a predetermined range of the second position information received by the receiving device.

Preferably, the acquiring device acquires the first position information using a GPS.

Preferably, the output device transmits the information received by the receiving device.

Preferably, the output device transmits the information received by the receiving device as a radio signal.

Preferably, the output device outputs the information received by the receiving device on a display.

More preferably, the output device transmits the first position information acquired by the acquiring device and the information received by the receiving device.

Also, more preferably, the output device transmits information which is based on a difference between the first position information acquired by the acquiring device and the second position information received by the receiving device, and the information received by the receiving device.

Preferably, the information received by the receiving device includes distance information, and the output device updates the distance information received by the receiving device according to a difference between the first position information acquired by the acquiring device and the second position information received by the receiving device, and transmits the information received by the receiving device and the updated distance information.

Preferably, the information received by the receiving device includes range information, and the output device outputs the information received by the receiving device, when it is determined that the first position information acquired by the acquiring device falls within a range of the range information received by the receiving device, from the second position information received by the receiving device.

Preferably, the acquiring device acquires third position information, and the output device outputs the information received by the receiving device, when it is determined that the third position information acquired by the acquiring device falls within a predetermined range of the first position information acquired by the acquiring device at a time the information has been received by the receiving device, at a time the output device determines whether or not the information received by the receiving device is to be outputted.

To attain the above object, in a second aspect of the present invention, there is provided an information output method comprising an acquiring step of acquiring first position information, a receiving step of receiving information including second position information, and a control step of controlling output of the information received in the receiving step, according to whether or not the first position information acquired in the acquiring step falls within a predetermined range of the second position information received in the receiving step.

Preferably, the control step comprises transmitting the first position information acquired in the acquiring step and the information received in the receiving step.

Preferably, the control step comprises transmitting information which is based on a difference between the first position information acquired in the acquiring step and the second position information received in the receiving step, and the information received in the receiving step.

Preferably, the information received in the receiving step includes range information, and the control step comprises controlling output of the information received in the receiving step, according to whether or not it is determined that the first position information acquired in the acquiring step falls within a range of the range information received in the receiving step, from the second position information received in the receiving step.

To attain the above object, in a third aspect of the present invention, there is provided an information output program comprising an acquiring module for acquiring first position information, a receiving module for receiving information including second position information and a control module for controlling output of the information received by the receiving module, according to whether or not the first position information acquired by the acquiring module falls within a predetermined range of the second position information received by the receiving module.

Preferably, the control module transmits the first position information acquired by the acquiring module and the information received by the receiving module.

Preferably, the control module transmits information which is based on a difference between the first position information acquired by the acquiring module and the second position information received by the receiving module, and the information received by the receiving module.

Preferably, the information received by the receiving module includes range information, and the control module controls output of the information received by the receiving module, according to whether or not it is determined that the first position information acquired by the acquiring module falls within a range of the range information received by the receiving module, from the second position information received by the receiving module.

To attain the above object, in a fourth aspect of the present invention, there is provided an information output system comprising an information transmitting apparatus, and an information output apparatus; wherein the information transmitting apparatus transmits first position information and output information, and the information output apparatus receives the first position information and the output information transmitted by the information transmitting apparatus, acquires second position information, and controls output of the received output information, according to whether or not the acquired second position information falls within a predetermined range of the received first position information.

To attain the above object, a fifth aspect of the present invention, there is provided an information transmitting apparatus comprising an acquiring device that acquires position information and a transmitting device that transmits transmission information including the position information acquired by the acquiring device and range information which designates a range, wherein the range information is transmitted for controlling output of the transmission information from an apparatus having received the transmission information, according to whether or not the apparatus having received the transmission information is located outside the range designated by the range information.

To attain the above object, in a sixth aspect of the present invention, there is provided an information transmitting method comprising an acquiring step of acquiring position information and a transmitting step of transmitting transmission information including the position information acquired in the acquiring step and range information which designates a range, to an information transmitting apparatus, wherein the range information is transmitted for controlling output of the transmission information from an apparatus having received the transmission information, according to whether or not the apparatus having received the transmission information is located outside the range designated by the range information.

To attain the above object, in a seventh aspect of the present invention, there is provided an information transmitting program comprising an acquiring module for acquiring position information and a transmitting module for transmitting transmission information including the position information acquired by the acquiring module and range information which designates a range, to an information transmitting apparatus, wherein the range information is transmitted for controlling output of the transmission information from an apparatus having received the transmission information, according to whether or not the apparatus having received the transmission information is located outside the range designated by the range information.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

Figure 1:
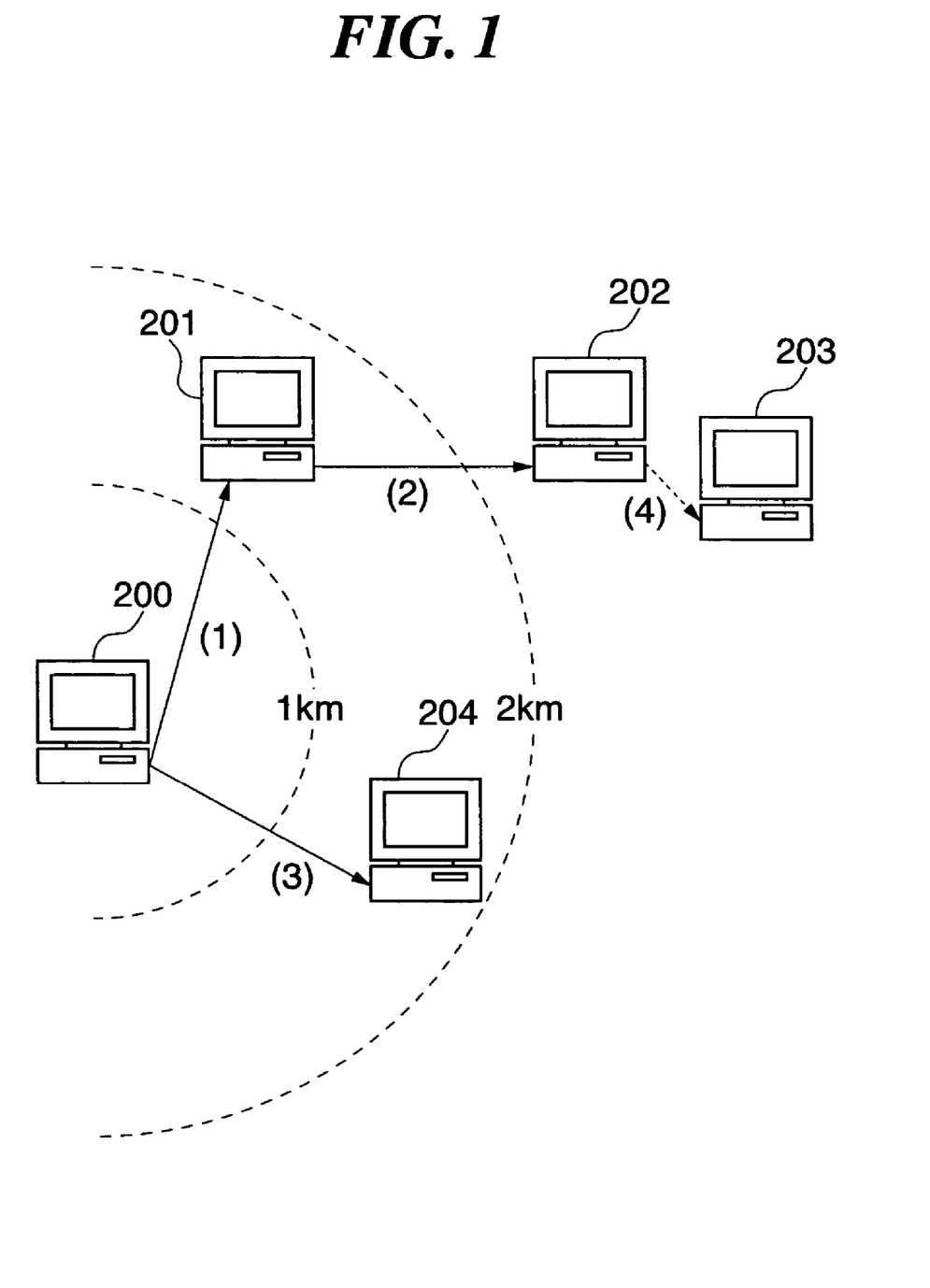
FIG. 1 is a diagram showing an example of the configuration of an information distribution system according to a first embodiment of the present invention.

FIG. 1 is a diagram showing an example of the configuration of an information distribution system according to a first embodiment of the present invention.

In FIG. 1, the information distribution system according to the present embodiment is a pure type P-to-P system. The information distribution system includes peers 200 to 204 (information output apparatuses, information transmitting apparatuses) implemented by PCs, which are connected in such a configuration as shown in FIG. 1, for distributing information in sequence or concatenation from one peer to another peer adjacent thereto.

In the present embodiment, each of the peers forming the information distribution system is provided with a function for acquiring position information indicative of its physical position to determine whether it should continue transferring information between the peers based on its physical position information, whereby the transfer of the information between the peers is controlled. Each peer may use e.g. a GPS (Global Positioning System) to acquire its physical position information.

When the user of the peer 200 as the information distribution source wishes to transmit information to peers e.g. within a radius of 2 kilometers from the peer 200 as the center, the peer 200 acquires its physical position information G0 from the GPS. Then, the peer 200 transmits its physical position information G0, a distribution range R0 which is e.g. the 2-kilometer radius from itself (peer 200) as the center, and distributing information I0 as information to be distributed, to the peers 201 and 204 adjacent thereto (indicated by arrows (1) and (3) in FIG. 1).

The peer 201 having received the position information G0, the distribution range R0, and the distributing information I0 acquires physical position information G1 of its own (peer 201) from the GPS. The peer 201 then calculates a distance from the information distribution source peer 200 to itself (peer 201) based on the position information G0 of the peer 200 received from the peer 200 and the position information G1 of its own (peer 201) acquired from the GPS.

The position information which each peer acquires from the GPS includes, for example, latitude information, longitude information, and altitude difference information that is indicative of a difference in height above average sea level.

Each of the peers receives these GPS data from the GPS, and extracts from the received GPS data longitude information, latitude information, and altitude difference information to acquire position information indicative of its physical spatial position. Then, the distance between the two peers is calculated based on their position information thus acquired. That is, for example, let it be assumed that the peer 200 is located at a position 1 whose latitude is $\phi_1$ and longitude is $\lambda_1$, and the peer 201 at a position 2 whose latitude is $\phi_2$ and longitude is $\lambda_2$, and that the orthogonal coordinates of the position 1 are $(x_1, y_1, z_1)$ and those of the position 2 are $(X_2, y_2, z_2)$. Then, the distance between the peer 200 located at the position 1 and the peer 201 located at the position 2, i.e. the transmission distance $D_n$ between these peers is calculated according to the following equation (500).

$$D_n = \sqrt{((x_1-x_2)^2+(y_1-y_2)^2+(z_1-z_2)^2)} \quad (500)$$

where $x_1, y_1, z_1, x_2, y_2$, and $z_2$ are calculated according to the following equations (501) to (506), respectively.

$$x_1 = N_1 \cos \phi_1 \cos \lambda_1 \quad (501)$$

$$y_1 = N_1 \cos \phi_1 \sin \lambda_1 \quad (502)$$

$$z_1 = N_1(1-e^2)\sin \Phi_1 \quad (503)$$

$$x_2 = N_2 \cos \phi_2 \cos \lambda_2 \quad (504)$$

$$y_2 = N_2 \cos \phi_2 \cos \lambda_2 \quad (505)$$

$$z_2 = N_2(1-e^2)\sin \Phi_2 \quad (506)$$

where $N_1$ and $N_2$ are calculated from the following equations (507) and (508), respectively; R represents the equatorial radius that is 6,378,136 meters; and e represents the eccentricity of the Earth that is 0.0167.

$$N_1 = R/\sqrt{(1-(e\sin\phi_1)^2)} \quad (507)$$

$$N_2 = R/\sqrt{(1-(e\sin\phi_2)^2)} \quad (508)$$

To simplify the calculation of the transmission distance $D_n$, e may be set to 0.

When the distance between the peers 200 and 201 calculated according to the equation (500) falls within the distribution range R0, the peer 201 displays the distributing information I0 on a display, and transfers the position information G0, the distribution range R0, and the distributing information I0 which is received from the peer 200, to the peer 202 adjacent thereto (indicated by an arrow (2) in FIG. 1).

The peer 202 having received the position information G0 of the peer 200, the distribution range R0, and the distributing information I0 from the peer 201 acquires physical position information G2 of its own (peer 202) from the GPS. The peer 202 then calculates according to the equation (500) the distance from the information distribution source peer 200 and itself (peer 202) based on the position information G0 of the peer 200 received from the peer 201 and the position information G2 of its own (peer 202) acquired from the GPS.

If the distance between the peers 200 and 202 calculated according to the equation (500) falls out of the distribution range R0, the distributing information I0 is not displayed on a display of the peer 202, and the transfer of the position information G0, the distribution range R0, and the distributing information I0 from the peer 202 to the peer 203 is also inhibited (indicated by an arrow (4) in FIG. 1).

In this way, the peer 200 can distribute the distributing information which has been started to be distributed by itself only to the peers within the desired range.

Thus, according to the present embodiment, information can be distributed only within a range desired by the user of the information distribution source, and hence the present embodiment is advantageous e.g. in sending information, such as distributing information of regional advertisements, only to people living in a predetermined geographical range.

Figure 2:
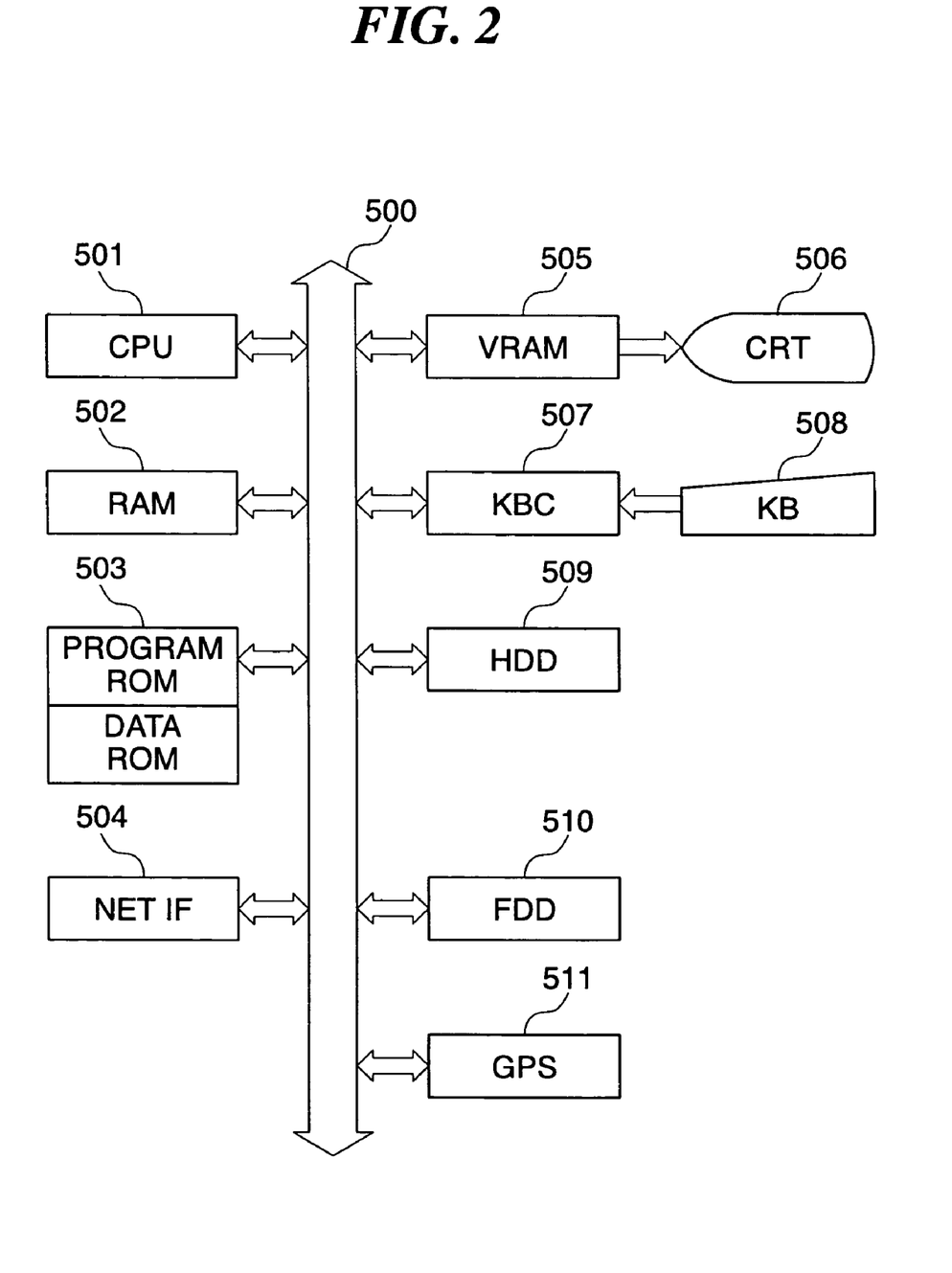
FIG. 2 is a block diagram showing the internal arrangement of each of peers appearing in FIG. 1.

FIG. 2 is a block diagram showing the internal arrangement of each of peers appearing in FIG. 1. The peers 200 to 204 are identical in construction, and only one of them will be described.

In addition to the desktop PCs shown in FIG. 1, the peers 200 to 204 may also be implemented by terminals having a function for communicating with other peers and a GPS function for acquiring position information, such as notebook PCs, palmtop PCs, workstations, various computer-incorporated home appliances such as TVs, game machines having a communication function, telephones, portable telephones, PHSs, faxes, electronic pocket notebooks, PDAs (Personal Digital Assistants), and any combination thereof.

A central processing unit (CPU) 501 controls the entire computer system. A random-access memory (RAM) 502 functions as a main memory as well as a program execution area and a data storage area for the CPU 501. A read-only memory (ROM) 503 stores processes executed by the CPU 501. The ROM 503 includes a program ROM storing basic software (OS, i.e. an operating system) that is a system program for controlling the components of the computer system, and a data ROM storing information necessary for operating the computer system. In some situations, a storage device 509, described later, may be used in place of the ROM 503.

A network interface (NETIF) 504 performs control for transferring data to another computer system via a network, and diagnoses the status of connection with another computer system. A video RAM (VRAM) 505 expands images for display on the screen of a display 506, described later, which displays the status of operation of the computer system, and controls how the images are displayed. The display (hereinafter CRT) 506 displays the images. A controller 507 controls input signals from an external input device 508. The external input device 508 accepts user operations to the computer system, and is implemented by e.g. a keyboard.

The storage device 509 is used to store data such as application programs and image information, and is implemented by e.g. a hard disk drive (HDD). The application programs in the present embodiment include software programs for implementing functions for distributing various information. An external input/output device (hereinafter FDD) 510 is a drive for inputting/outputting removable media, such as a floppy (trademark) disk drive or a CD-ROM drive, and is used to read the application programs from the removable media. The application programs and data for storage in the HDD 509 may be stored in a removable medium in the FDD 510.

A position information acquiring device 511 acquires position information indicative of the physical position of its own (computer system), and may be implemented by e.g. a GPS. An input/output bus 500 interconnects the above-mentioned devices, and is comprised of an address bus, a data bus, and a control bus.

Next, the arrangement of application modules of each of the peers 200 to 204 in the information distribution system will be described with reference to FIG. 3.

The functions of the application modules described below are achieved by supplying each of the peers 200 to 204 with a storage medium in which a program code of software which realizes the functions is stored, and causing a computer (or the CPU 501 or MPU) in each of the peer 200 to 204 to read out and execute the program code stored in the storage medium.

Figure 3:
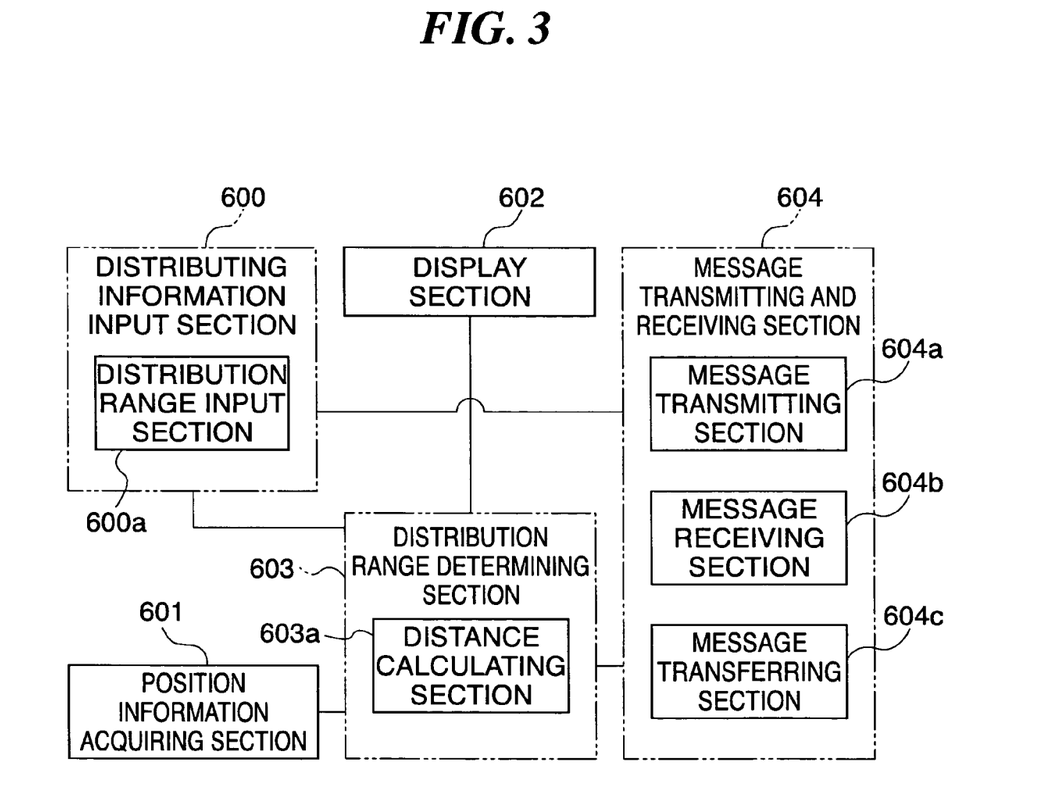
FIG. 3 is a block diagram showing the arrangement of application modules of an information distributing process executed by each peer.

In FIG. 3, each of the peers 200 to 204, which are information output apparatuses according to the first embodiment, is provided with an distributing information input section 600, a position information acquiring section 601, a display section 602, a distribution range determining section 603, and a message transmitting and receiving section 604. The distributing information input section 600 further includes a distribution range input section 600a. The distribution range determining section 603 further includes a distance calculating section 603a. The message transmitting and receiving section 604 further includes a message transmitting section 604a, a message receiving section 604b, and a message transferring section 604c.

The distributing information input section 600 inputs desired distributing information I0 which the user prepared beforehand by the peer (computer system). The distribution range input section 600a inputs the distribution range R0. The distribution range input section 600a in the distributing information input section 600 inputs the distributing information I0 and the distribution range R0 via the external input device 508, the external input/output device 510, or the NETIF 504. The position information acquiring section 601 acquires the position information G0 from the GPS 511. The display section 602 displays the distributing information I0 and other information on the CRT 506 when the distance calculated according to the equation (500) falls within the distribution range R0.

The distribution range determining section 603 determines whether or not it (peer) is located within the distribution range R0, based on the distribution range R0 contained in a message received from the information distribution source peer and the distance from the peer. The distance calculating section 603a calculates the distance from the information distribution source peer to itself (peer) according to the equation (500). The determination as to whether or not the peer in question is located within the distribution range R0, and the calculation of the distance from the information distribution source peer to the peer in question are performed by the CPU 501. The message transmitting and receiving section 604 transmits and receives messages to and from another peer via the NETIF 504. The message transmitting section 604a controls transmission of messages, the message receiving section 604b controls reception of messages, and the message transferring section 604c controls transfer of messages.

Next, the procedures of processes for distributing, transferring, and displaying messages carried out by the information distribution system constructed as above will be described with reference to FIGS. 4 and 5.

Figure 4:
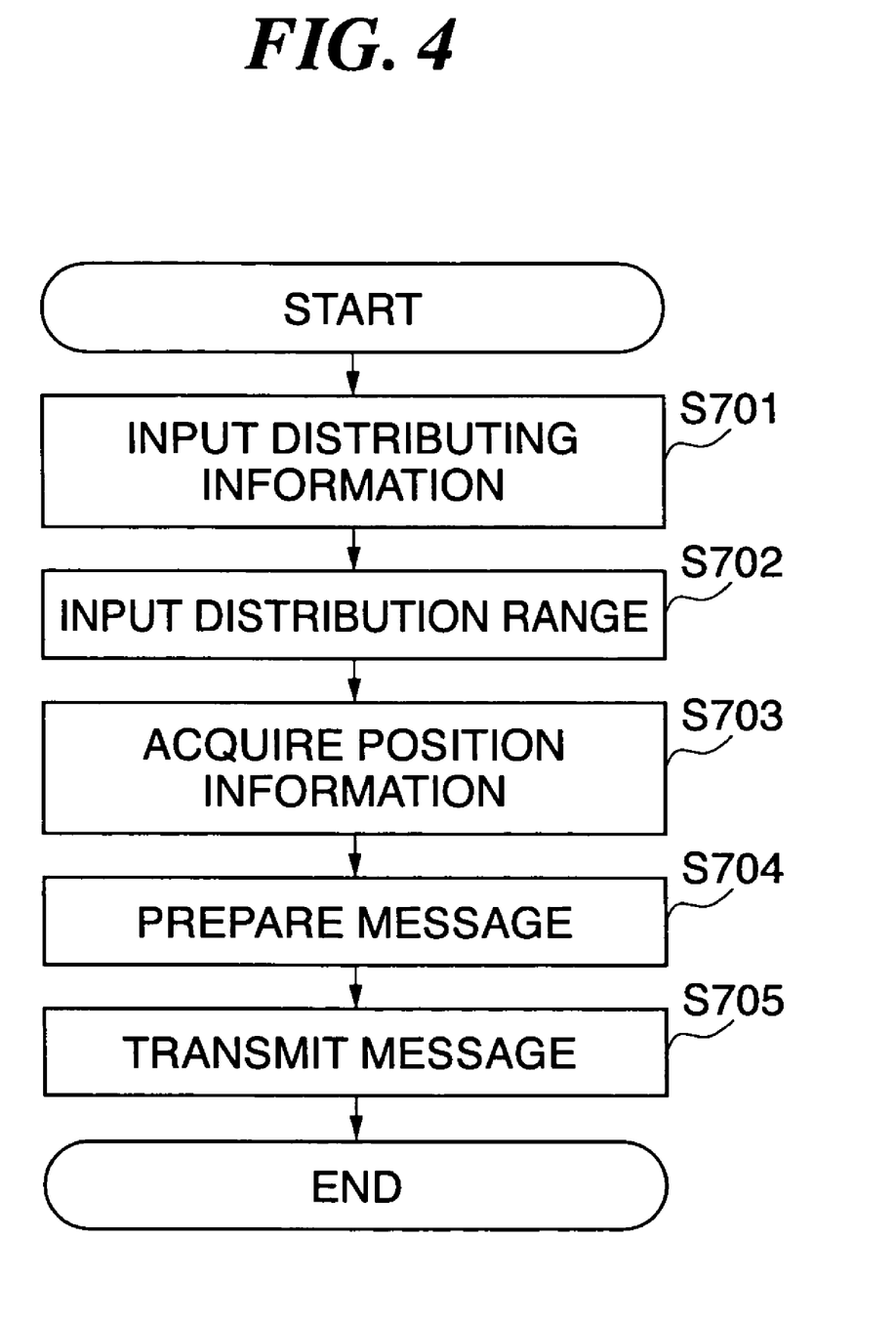
FIG. 4 is a flowchart showing the procedure of a message distributing process executed by a peer of the information distribution system.

FIG. 4 is a flowchart showing the procedure of a message distributing process executed by a peer of the information distribution system. The message distributing process is executed by an information distribution source (peer 200 in the illustrated example).

As shown in FIG. 4, first, in a step S701, a user operating the peer 200 inputs desired distributing information I0 which he/she prepared beforehand, via the distributing information input section 600, and then, in a step S702, inputs the distribution range RD via the distribution range input section 600a of the distributing information input section 600. Then, in a step S703, the peer 200 acquires its position information G0 from the GPS 511 via the position information acquiring section 601.

Then, in a step S704, the peer 200 generates a message to be distributed based on the distributing information I0 inputted in the step S701, the distribution range R0 inputted in the step S702, and the position information G0 acquired in the step S703. And, in a step S705, the peer 200 transmits the message generated in the step S704 to the message receiving section 604b of the message transmitting and receiving section 604 of the adjacent peer 201 and the peer 204, via the message transmitting section 604a of its message transmitting and receiving section 604. Thereafter, the process proceeds to a message transfer and display process executed by the peers 201 and 204 having received this message.

Figure 5:
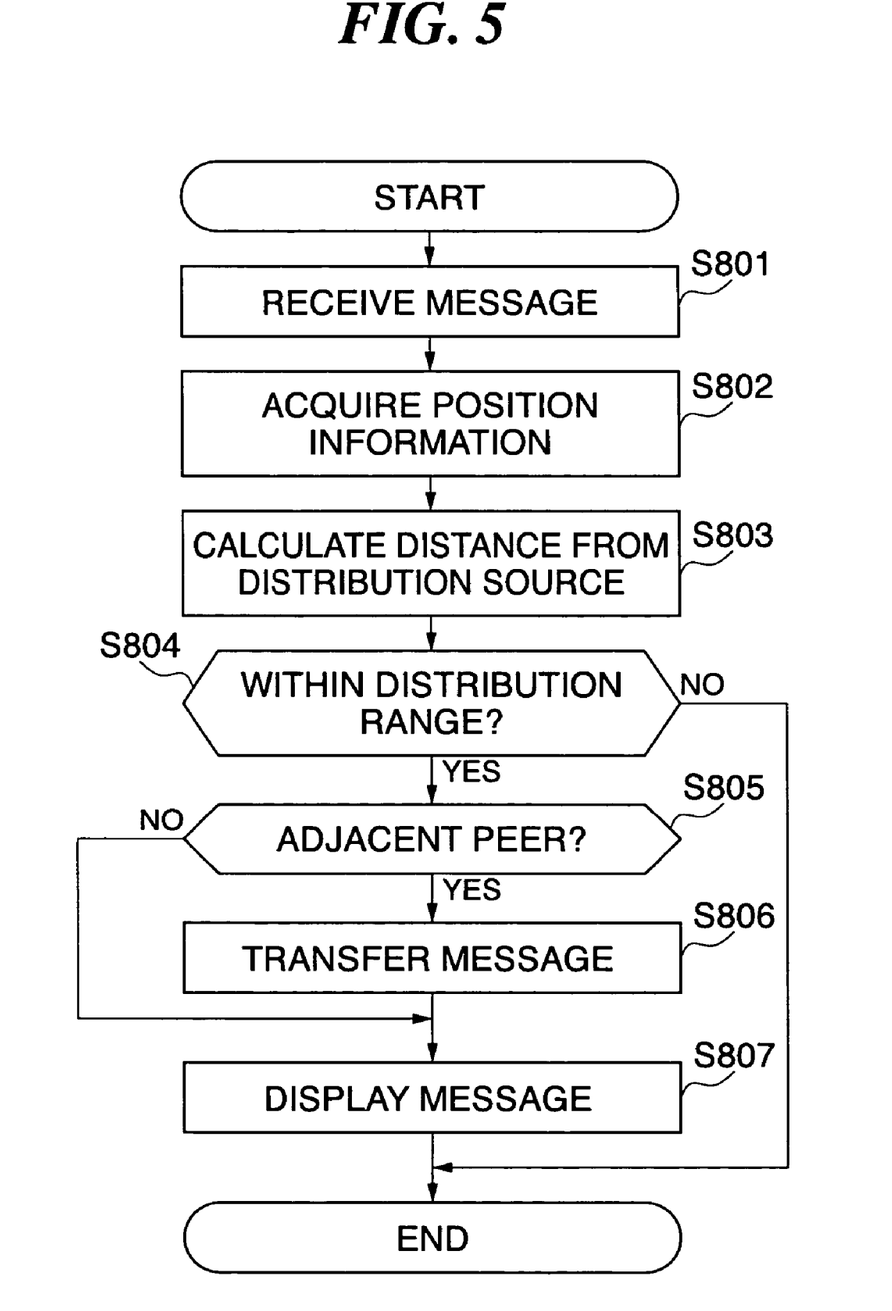
FIG. 5 is a flowchart showing the procedure of a message transfer and display process executed by a peer of the information distribution system.

FIG. 5 is a flowchart showing the procedure of a message transfer and display process executed by a peer of the information distribution system. The message transfer and display process is executed by the peers (the peers 201 to 204 in the present example) which are destinations of the message transmitted from the information distribution source (the peer 200 in this example). The peer 201 is taken as an example of the destination of the message in the following description.

As shown in FIG. 5, first, in a step S801, the peer 201 receives the message transmitted from the peer 200 via the message receiving section 604b of its message transmitting and receiving section 604. Next, in a step S802, the peer 201 acquires its position information G1 from the GPS 511 via its position information acquiring section 601. Next, in a step S803, the peer 201 calculates the distance from the information distribution source peer 200 to itself (peer 201), via its distance calculating section 603a, using the equation (500) based on the position information G0 of the peer 200 contained in the message received in the step S801 and its position information G1 acquired in the step S802.

Then, in a step S804, the peer 201 determines, via its distribution range determining section 603, whether or not it (peer 201) is located within the distribution range R0 based on the distribution range R0 contained in the message received in the step S801 and the distance from the source peer 200 to itself (peer 201) calculated in the step S803. If the peer 201 determines that it is out of the distribution range R0 (NO to the step S804), the present process is immediately terminated by skipping subsequent steps S805 to S807.

If the peer 201 determines that it is located within the distribution range R0 (YES to the step S804), then, in the step S805, the peer 201 further determines whether or not there is any peer adjacent thereto. This determination may be made by transmitting an inquiry signal from the message transmitting module section 604a and checking if a response signal has been received from an adjacent peer via the message receiving section 664b. If the peer 201 determines that there is no adjacent peer (NO to the step S805), the process jumps to the step S807 by skipping the next message transferring step S806. If the peer 201 determines that there is an adjacent peer (YES to the step S805), the process proceeds to the message transferring step S806.

In the step S806, the peer 201 transfers (outputs) the message to the message receiving section 604b of the message transmitting and receiving section 604 of the adjacent peer via the message transferring section 604c of its message transmitting and receiving section 604. The message may be transferred without executing the determination as to whether or not there is any peer adjacent to itself in the step S805. That is, the determination in the step S805 may be omitted. Next, in the step S807, the peer 201 displays (outputs) the distributing information I0 contained in the message received in the step S801 on the screen of its CRT 506 (FIG. 2) via its display section 602. It should be noted that the peer 201 inserts into the message for transfer information including a date and the number of hops (TTL: how many peers ahead the information is to be transmitted to) so as to avoid endless distribution in which distribution of the information loops endlessly within the distribution range.

As described above, according to the present embodiment, in the information distribution system which is capable of distributing information between a plurality of peers in sequence, a peer as an information distribution source transmits distributing information, its position information, and a set distribution range to a peer adjacent thereto. And when the adjacent peer is located within the distribution range based on the position information and distribution range received, and its position information, it displays the distributing information, and also transfers the distributing information, position information, and distribution range received from the source peer, to a peer adjacent thereto, whereas, when the adjacent peer is located outside the distribution range, the adjacent peer is inhibited from transferring the distributing information, position information, and distribution range received from the source peer. Therefore, information such as area-limited advertisements can be distributed only within a predetermined range.

That is, the information distribution source peer transmits the distributing information, its position information, and the distribution range to the adjacent peer, and subsequent peers transmit the information in sequence to their adjacent peers insofar as they are located within the distribution range, whereby the peers within a predetermined distribution range from the information distribution source peer can be searched in sequence or concatenation from one peer to another, and hence the information can be distributed in sequence or concatenation to the peers within the distribution range.

Next, transfer control of distributing information between peers will be described with reference to FIG. 6, which is carried out based on a transmission distance by an information distribution system (pure type P-to-P system) according to a second embodiment of the present invention.

Figure 6:
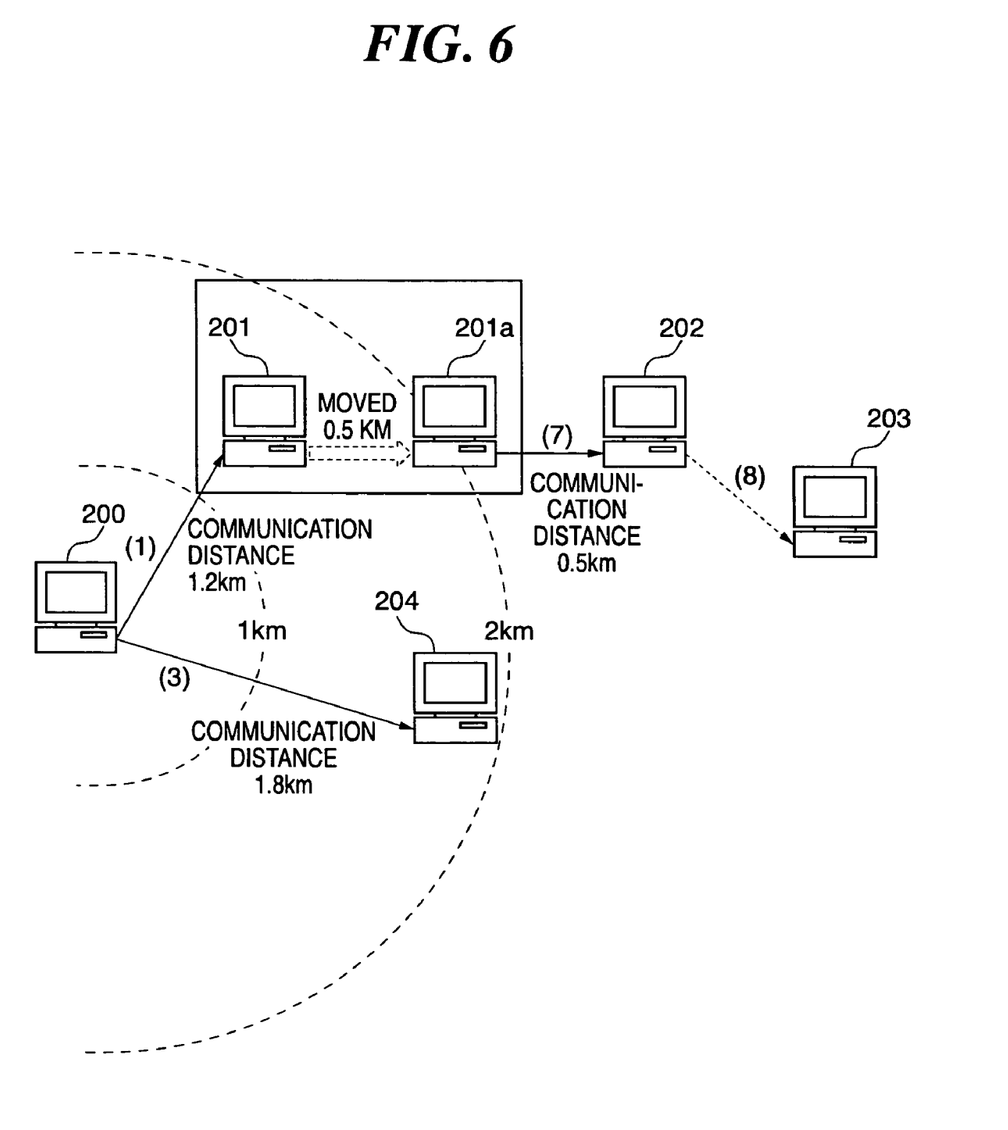
FIG. 6 is a diagram showing an example of the configuration of an information distribution system according to a second embodiment of the present invention.

FIG. 6 is a diagram showing the configuration of the information distribution system according to the present embodiment.

Note that the present embodiment shares the constructions shown in FIGS. 2 and 3 with the first embodiment.

For example, let it be assumed that a peer 200 is a information distribution source, and the user of the peer 200 wishes to distribute distributing information to peers located within a transmission distance of 2 kilometers from the source peer 200. First, the peer 200 acquires position information G0 indicative of its physical spatial position from the GPS. The peer 200 then transmits the position information G0, information of a distribution-allowable transmission distance R0 (2 kilometers in the present example) indicative of a maximum information distribution range, and the distributing information I0, to adjacent peers 201 and 204 (indicated by arrows (1) and (3) in FIG. 6).

The peer 201 having received the position information G0, the information of the distribution-allowable transmission distance R0, and the distributing information I0 from the peer 200 acquires position information G10 indicative of its physical spatial position at the time of its reception, from the GPS. And the peer 201 calculates a transmission distance $D_n$ from the information distribution source peer 200 to itself (2 kilometers in the example shown in FIG. 6) based on the received position information G0 of the peer 200 and its position information G10. The equation (500) is used for this calculation.

Then, the peer 201 calculates a remaining distribution-allowable transmission distance R10, which is the remaining distance obtained by subtracting the transmission distance $D_n$ calculated according to the equation (500) from the received distribution-allowable transmission distance R0 (2 kilometers−1.2 kilometers=0.8 kilometers in the example shown in FIG. 6). If the remaining distribution-allowable transmission distance R10 is 0 or mote, then the peer 201 displays the distributing information I0 on its CRT. If the spatial position of the peer 201 is fixed, i.e. the peer 201 is not moving, the peer 201 transmits its physical position information G10, the remaining distribution-allowable transmission distance R10 (0.8 kilometers), and the distributing information I0, to an adjacent peer 202.

In the case where the peer 201 has physically moved to a certain position (at a distance of 0.5 kilometers in the example shown in FIG. 6) before transferring the distributing information I0 to the peer 202 (the peer 201 having moved to the above position will be hereinafter referred to as the peer 201*a*), the peer 201*a* acquires transmission-time position information G11 indicative of its physical spatial position from the GPS when transferring the distributing information I0 to the peer 202. And the peer 201*a* calculates a physical distance it moved, from both its reception-time position information G10 and its transmission-time position information G11, according to the equation (500). Then, by subtracting the calculated moved distance from the reception-time remaining distribution-allowable transmission distance R10, the peer 201*a* calculates a transmission-time remaining distribution-allowable transmission distance R11 (0.8 kilometers−0.5 kilometers=0.3 kilometers in the example shown in FIG. 6). And if the calculated transmission-time remaining distribution-allowable transmission distance R11 is 0 or more, the peer 201*a* transfers its transmission-time position information G11, the transmission-time remaining distribution-allowable transmission distance R11, and the distributing information I0, to the peer 202 (indicated by an arrow (7) in FIG. 6). If the calculated transmission-time remaining distribution-allowable transmission distance R11 has a negative value, the peer 201*a* does not display the distributing information I0 on its CRT, nor transfers the distributing information I0 to the peer 202.

The peer 202 having received the transmission-time position information G11 of the peer 201*a*, the transmission-time remaining distribution-allowable transmission distance R11 of the peer 201*a* (0.3 kilometers in the example shown in FIG. 6), and the distributing information I0 from the peer 201*a* acquires position information G20 indicative of its physical spatial position from the GPS. And the peer 202, using the received transmission-time position information G11 of the peer 201*a* and its position information G20, calculates a transmission distance from the peer 201*a* according to the above equation (500) (0.5 kilometers in the example shown in FIG. 6). Then, by subtracting the calculated transmission distance from the transmission-time remaining distribution-allowable transmission distance R11, the peer 202 calculates a reception-time remaining distribution-allowable transmission distance R20 (0.3 kilometers−0.5 kilometers=−0.2 kilometers in the example shown in FIG. 6). If this reception-time remaining distribution-allowable transmission distance R20 has a negative value, the peer 202 does not display the distributing information I0 on its CRT, nor does it transfer the distributing information I0 to a next peer 203 (indicated by an arrow (8) in FIG. 6).

Referring again to FIG. 4, a description will be given of the procedure of the process for distributing information executed by the information distribution source peer (the peer 200 in the example shown in FIG. 6) in the second embodiment.

In the step S701, a user operating the information distribution source peer inputs distributing information I0 prepared beforehand via the distributing information input section 600, and then, in the step S702, inputs the distribution-allowable transmission distance R0 indicative of the maximum information distribution range via the distribution range input section 600*a* of the distributing information input section 600. The information inputted in the step S702 is different from that in the first embodiment.

In the step S703, the position information acquiring section 601 acquires the position information G0 from the GPS.

And in the step S704, a message is generated which includes the distributing information I0 inputted in the step S701, the distribution-allowable transmission distance R0 inputted in the step S702, and the position information G0 acquired in the step S703. Then, in the step S705, the message transmitting section 604*a* of the message transmitting and receiving section 604 transmits the message generated in the step S704 to the message receiving section 604*b* of the message transmitting and receiving section 604 of an adjacent peer.

Figure 7:
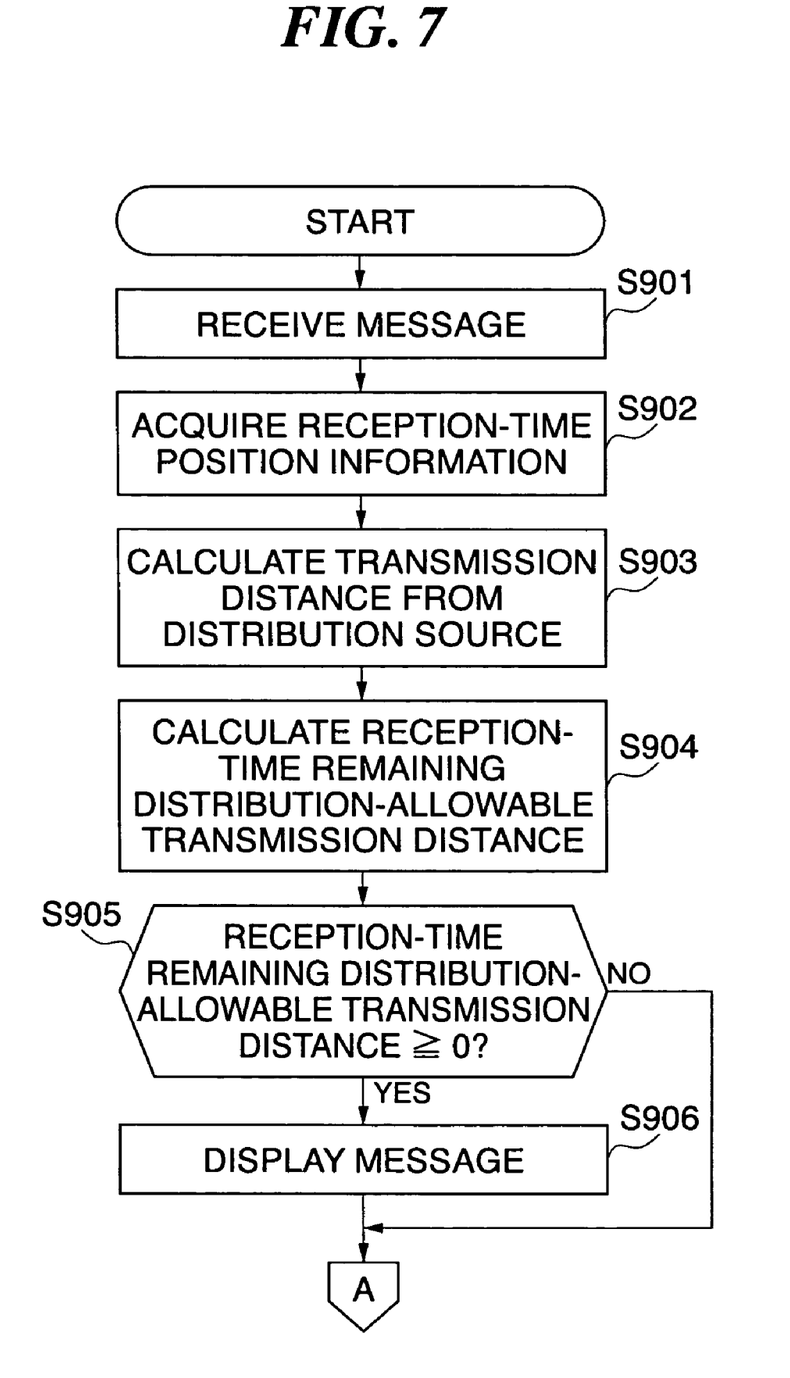
FIG. 7 is a flowchart showing the procedure of a distributing information display and transfer process executed by a destination peer having received a message transmitted from a source peer.
Figure 8:
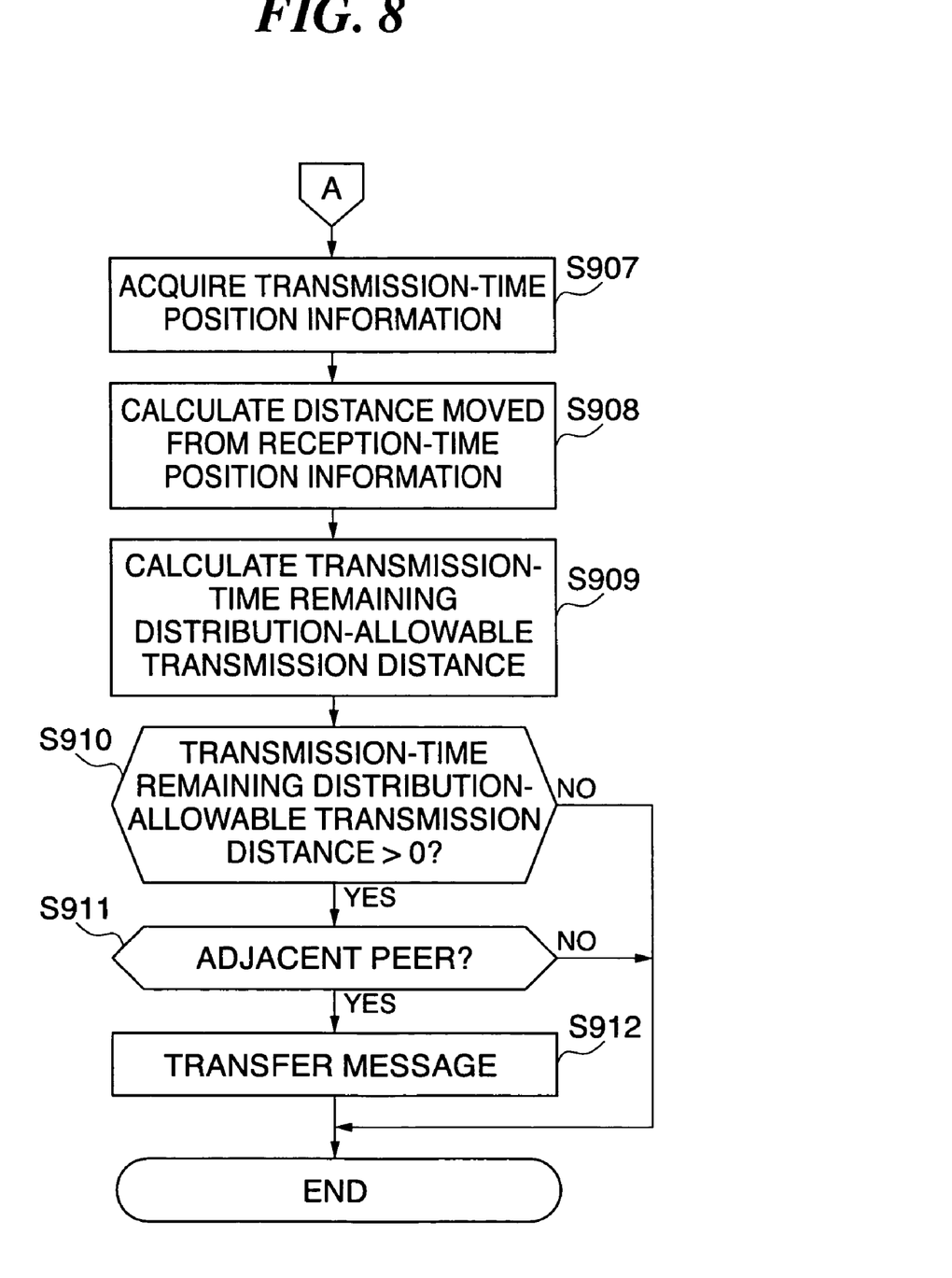
FIG. 8 is a flowchart showing a continued part of the flowchart of FIG. 7.

Next, referring to FIGS. 7 and 8, the procedure of a distributing information display and transfer process will be described, which is executed by a destination peer having received the message transmitted from the peer as the information distribution source (any of the peers 201 to 204 in the example shown in FIG. 6). FIG. 7 is a flowchart showing the procedure of the distributing information display and transfer process executed by the destination peer having received a message transmitted from the source peer. FIG. 8 is a flowchart showing a continued part of the flowchart of FIG. 7.

First, in a step S901, the message receiving section 604*b* of the destination peer receives the message transmitted from the information distribution source peer. Then, in a step S902, the position information acquiring section 601 of the destination peer acquires its reception-time position information G10 from the GPS 511.

Then, in a step S903, the distance calculating section 603*a* of the destination peer calculates the transmission distance $D_n$ from the information distribution source peer to the destination peer according to the equation (500) using the position information G0 of the source peer contained in the message received in the step S901 and the reception-time position information G10 of the destination peer acquired in the step S902.

Then, in a step S904, the distribution range determining section 603 calculates the reception-time remaining distribution-allowable transmission distance R10 obtained by subtracting the transmission distance $D_n$ from the distribution-allowable transmission distance R0, using the distribution-allowable transmission distance R0 contained in the message received in the step S901 and the transmission distance $D_n$ from the information distribution source peer to the destination peer calculated in the step S903.

Then, in a step S905, it is determined whether or not the reception-time remaining distribution-allowable transmission distance R10 calculated in the step S904 is 0 or more. If the resulting reception-time remaining distribution-allowable transmission distance R10 is less than 0 or has a negative value (NO to the step S905), then the process skips over a step S906 to a step S907 shown in FIG. 8. In the case of NO to the step S905, the present process may be immediately terminated by skipping subsequent steps S906 to S912. On the other hand, if the reception-time remaining distribution-allowable transmission distance R10 is 0 or more (YES to the step S905), the process proceeds to the step S906 to display (output) the distributing information I0 contained in the message received in the step S901 on the screen of the CRT 506 (FIG. 2) via the display section 602.

When the destination peer becomes ready for transmission, its position information acquiring section 601 acquires its transmission-time position information G11 from the GPS 511 (step S907 in FIG. 8). For example, in an embodiment in which message transfer is prohibited during movement of the destination peer, the destination peer checks position information outputted from the GPS 511 at predetermined time intervals, and waits without transferring the message until the amount of position changed assumes a predetermined threshold or less. When the amount of position changed is equal to the predetermined threshold or less, the position information at this time is used as the transmission-time position information G11 for a determination as to whether the message is to be transferred or not.

Then, in a step S908, the distance calculating section 603a of the destination peer calculates the distance it physically moved between the reception time of the distributing information and the transmission time of the same, according to the above equation (500) using its reception-time position information G10 acquired in the step S902 and its transmission-time position information G11 acquired in the step S907.

In a step S909, the distribution range determining section 603 of the destination peer calculates the transmission-time remaining distribution-allowable transmission distance R11 by subtracting the moved distance calculated in the step S908 from the reception-time remaining distribution-allowable transmission distance R10 calculated in the step S904.

And in a step S910, it is determined whether or not the transmission-time remaining distribution-allowable transmission distance R11 calculated in the step S909 is equal to 0 or more. If the resulting transmission-time remaining distribution-allowable transmission distance R11 is less than 0 (NO to the step S910), the present process is immediately terminated by skipping steps S911 and S912. On the other hand, if the transmission-time remaining distribution-allowable transmission distance R11 is 0 or more (YES to the step S910), the process proceeds to the step S911 to determine whether or not there is a next adjacent peer. If there is no adjacent peer (NO to the step S911), the present process is immediately terminated by skipping the step S912. On the other hand, if there is an adjacent peer (YES to the step S911), the process proceeds to the step S912.

In the step S912, the message transferring section 604c of the destination peer generates a message containing the distributing information I0, the transmission-time remaining distribution-allowable transmission distance R11, and its transmission-time position information G11, and transmits (outputs) the generated message to the message receiving section 604b of the next adjacent peer. Note that the message may be transferred without executing the determination as to whether or not there is an adjacent peer in the step S911. That is, the determination in the step S911 may be omitted.

In an embodiment in which the message is transferred immediately upon reception, the reception-time position is the same as the transmission-time position. In this embodiment, the steps S907 and S908 are omitted, and the transmission-time remaining distribution-allowable transmission distance R11 calculated in the step S909 is equal to (distribution-allowable transmission distance R0 contained in the message received in the step S901)—(transmission distance $D_n$ from the information distribution source peer to the destination peer calculated in the step S903). Additionally, in this embodiment, transmitted is a message containing this remaining distribution-allowable transmission distance R11, the position information G10 acquired in the step S902, and the distributing information I0.

As described above, according to the present embodiment, each of the peers 200 to 204 forming the network acquires its position information, and the information distribution source peer 200 designates the distribution-allowable transmission distance R0, whereby the source peer 200 can distribute e.g. area-limited advertisements or the like only to those peers located within the range of the distribution-allowable transmission distance R0.

In the present invention, the number of destination peers is not limited, unlike the method in which the number of peers to which information is to be distributed is set, and the farther the transmission distance from an information distribution source, the smaller the number of destination peers to which information can be distributed, whereas the nearer the transmission distance from the information distribution source, the larger the number of destination peers to which information can be distributed. Therefore, the present embodiment is advantageous in distributing information such as regional advertisements, only to people living in the range of a predetermined distance from an information distribution source.

Further, the distribution end is determined using the transmission distance set for the distributing information, and thus the transmission can be reliably terminated.

Still further, in the case of a peer which is a movable terminal such as a cellular telephone, the peer may physically move between the reception time of the distributing information and the transmission time of the same. Since the transmission distance is calculated taking into account such physical movement of the peer, information distribution control can be achieved which is based on a correct transmission distance.

It should be noted that in the first and second embodiments the range or distance for displaying a message and the range or distance for transferring the message may be set separately. For example, the message is displayed when the range or distance is determined to be within 2 kilometers, and the message is transferred when the range or distance is determined to be within 1.5 kilometers.

Although in the first and second embodiments the information distribution system is configured as shown in FIG. 1, the configuration of the information distribution system is not limited thereto. The number of peers, the information distribution routing, and the information distribution range may be arbitrarily set.

It is to be understood that the object of the present invention may also be achieved by supplying a system or an apparatus with a storage medium in which a program code (the flowcharts of FIGS. 4, 5, 7 and 8) of software which realizes the functions of either of the above described embodiments is stored, and causing a computer (or CPU 301 or MPU) of the system or apparatus to read out and execute the program code stored in the storage medium.

In this case, the program may be supplied directly from a storage medium on which the program code is stored, or by downloading from a computer, database, or the like, not shown, that is connected via the Internet, a commercial network, a local area network, or the like.

The form of the program may be an object code, a program code executed by an interpreter, or script data supplied to an OS (Operating System).

Further, it is to be understood that the functions of either of the above described embodiments may be accomplished not only by executing a program code read out by a computer (CPU), but also by causing an OS (operating system) or the like which operates on the computer to perform a part or all of the actual operations based on instructions of the program code.

Furthermore, the object of the present invention may be accomplished by downloading the program code of the software which realizes either of the above-described embodiments from a database or website on a network via a communication program, and then reading out and executing the downloaded program code.

The program may also be supplied by connecting a client computer to a website on the Internet using a browser of the client computer, and causing the client computer to download from the website the program code itself or a compressed file including an automatic installation function to a storage medium such as a hard disk.

Moreover, the above program may also be supplied by distributing a storage medium such as a CD-R0M to users after encrypting and storing the program code in the storage medium, and allowing only a qualified user who satisfies a predetermined condition to download key information for decrypting the program code from a website via the Internet and to execute the encrypted program code using the key information, for installation to a computer.

The functions of either of the above-described embodiments may also be accomplished by dividing the program code into a plurality of files, and downloading the respective files from different websites. That is, a WWW server that allows a plurality of users to download the program files for enabling computers to realize the functional processing of the present invention also constitutes the present invention.

Further, it is to be understood that the functions of either of the above described embodiments may be accomplished by writing a program code read out from the storage medium into a memory provided on an expansion board inserted into a computer or in an expansion unit connected to the computer and then causing a CPU, a MPU or the like provided in the expansion board or the expansion unit to perform a part or all of the actual operations based on instructions of the program code.

While the present invention has been described above based on the preferred embodiments thereof, the present invention is not limited to the above-described embodiments, but may be modified in various ways within the spirit and scope of the appended claims.

What is claimed is:

1. An internal information output apparatus comprising:
   a receiving unit adapted to receive, from a first external information output apparatus, output information, position information of the first external information output apparatus, and a first transmission range of the output information;
   a calculating unit adapted to calculate a distance between the internal information output apparatus and the first external information output apparatus based on position information of the internal information output apparatus and the position information of the first external information output apparatus; and
   a transmission unit adapted to transmit to a second external information output apparatus, the output information received by said receiving unit, the position information of the internal information output apparatus, and a second transmission range which is obtained by subtracting the distance calculated by said calculating unit from the first transmission range, when the distance calculated by said calculating unit is within the first transmission range.

2. An internal information output apparatus as claimed in claim 1, further comprising an acquiring unit adapted to acquire the position information of the internal information output apparatus by using a GPS.

3. An internal information output apparatus as claimed in claim 1, wherein said transmission unit transmits the information as a radio signal.

4. An internal information output apparatus as claimed in claim 1, further comprising an output unit adapted to output the output information on a display.

5. An internal information output apparatus as claimed in claim 1, further comprising an acquiring unit adapted to acquire the first position information of the internal information output apparatus; wherein said acquiring unit acquires second position information, and said transmission unit transmits the information received by said receiving unit, when it is determined that the second position information acquired by said acquiring unit falls within a predetermined range of the first position information acquired by said acquiring unit at a time the information has been received by said receiving unit, at a time said transmission unit determines whether or not the information received by said receiving device is to be transmitted.

6. An information output method for an internal information output apparatus comprising:
   a receiving step of receiving, from the first external information output apparatus, output information, position information of a first external information output apparatus, and a first transmission range of the output information;
   a calculating step of calculating a distance between the internal information output apparatus and the first external information output apparatus based on position information of the internal information output apparatus and the position information of the first external information output apparatus; and
   a transmission step of transmitting to a second external information output apparatus, the output information received in said receiving step, the position information of the internal information output apparatus, and a second transmission range which is obtained by subtracting the distance calculated in said calculating step from the first transmission range, when the distance calculated in said calculating step is within the first transmission range.

7. A computer-readable medium storing a control program for controlling a computer which receives output information from an external information output apparatus, the control program containing instructions for:
   calculating a distance between the internal information output apparatus and a first external information output apparatus based on position information of the internal information output apparatus and position information of the first external information output apparatus, in a case of receiving from the first external information output apparatus, position information of the first external information output apparatus and a first transmission range of the output information; and
   performing processes to transmit to a second external information output apparatus, the output information received from the first external information output apparatus, the position information of the internal information output apparatus, and a second transmission range which is obtained by subtracting the distance calculated in said calculating step from the first transmission range, when the distance calculated in said calculating step is within the first transmission range position information acquired by said acquiring module falls within a predetermined range of the second position information received by said receiving module.

8. An information output system comprising:
an information transmitting apparatus; and
an internal information output apparatus,
wherein:
said information transmitting apparatus transmits first position information of the information transmitting apparatus and output information; and
said internal information output apparatus receives the first position information and the output information transmitted by said information transmitting apparatus, acquires second position information of the internal information output apparatus, and controls transmission of the received output information and the acquired second position information to a second internal information output apparatus, according to whether or not the acquired second position information falls within a predetermined range of the received first position information.

9. An internal information output apparatus comprising:
a receiving unit adapted to receive, from a source apparatus via a first external information output apparatus, output information, position information of a source apparatus, and a transmission range of the output information;
a determining unit adapted to determine whether a position of the internal information output apparatus is within a transmission range of the source apparatus based on the position information of the source apparatus, the position of the internal information output apparatus, and the transmission range of the output information; and
a transmitting unit adapted to transmit to a second external information output apparatus, the output information, the position information of the source apparatus, and the transmission range of the output information received via the first internal information output apparatus, when the determining unit determined that the position of the internal information output apparatus is within the transmission range of the source apparatus.

10. An information output method for an internal information output apparatus, comprising:
a receiving step of receiving, from a source apparatus via a first external information output apparatus, output information, position information of a source apparatus, and a transmission range of the output information;
a determining step of determining whether the position of the internal information output apparatus is within the transmission range of the source apparatus based on the position information of the source apparatus and the position of the internal information output apparatus and the transmission range of the output information; and
a transmitting step of transmitting to a second external information output apparatus, the output information, the position information of the source apparatus, and the transmission range of the output information received via the first external information output apparatus, when it is determined in said determining step that the position of the internal information output apparatus is within the transmission range of the source apparatus.

11. A computer-readable medium storing a control program for controlling a computer which receives output information from a source apparatus via an external information output apparatus, the control program containing instructions for:
determining whether the position of the internal information output apparatus is within a transmission range of a source apparatus based on position information of the source apparatus and the position of the internal information output apparatus and the transmission range of the output information, in a case of receiving the position information of the source apparatus and the range of output information; and
performing processes to transmit to a second external information output apparatus, the output information, and the position information of the source apparatus, and the transmission range of the output information, when it is determined in said determining step that the position of the internal information output apparatus is within the transmission range of the source apparatus.

* * * * *